United States Patent [19]

Rousseau

[11] Patent Number: 4,655,090
[45] Date of Patent: Apr. 7, 1987

[54] TURBINE FLOWMETER FOR FLUIDS
[75] Inventor: Alain Rousseau, Paris, France
[73] Assignee: Sato Electronique S.A., Paris, France
[21] Appl. No.: 859,482
[22] Filed: May 5, 1986
[30] Foreign Application Priority Data
  May 9, 1985 [FR] France ................................. 85 07001
[51] Int. Cl.$^4$ ................................................ G01F 1/08
[52] U.S. Cl. ................................................ 73/861.81
[58] Field of Search ........... 73/861.33, 861.79, 861.81, 73/861.87

[56]  References Cited
  U.S. PATENT DOCUMENTS 3,329,021  7/1976  Quesinberry et al. ............ 73/861.79
  3,867,840  2/1975  Baatz ................................ 73/861.33
  4,047,433  9/1977  Dabanian .......................... 73/861.33
  4,161,879  7/1979  Dunne, Jr. ........................ 73/861.81

Primary Examiner—Herbert Goldstein
Attorney, Agent, or Firm—Dowell & Dowell

[57]  ABSTRACT

A turbine flowmeter for fluids of the type comprises a turbine rotatable in a chamber of circular section equipped with an admission orifice substantially tangential to the said chamber and with an outlet orifice, the said chamber comprising a plurality of axial recesses creating a turbulence within the chamber.

The admission orifice opens into one of the lateral walls of one of the said recesses of the chamber in such manner that at least a part of the fluid flow comes to strike upon the opposite lateral wall of the said recess.

1 Claim, 2 Drawing Figures

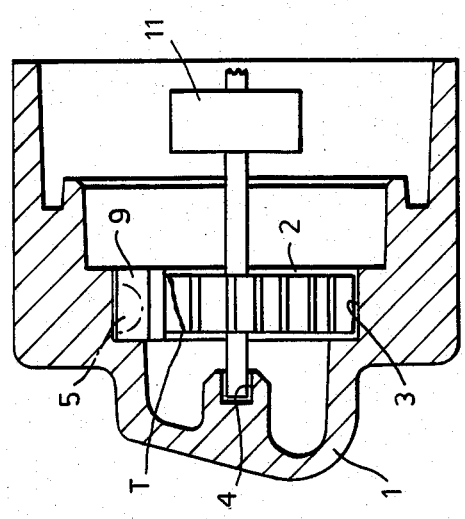
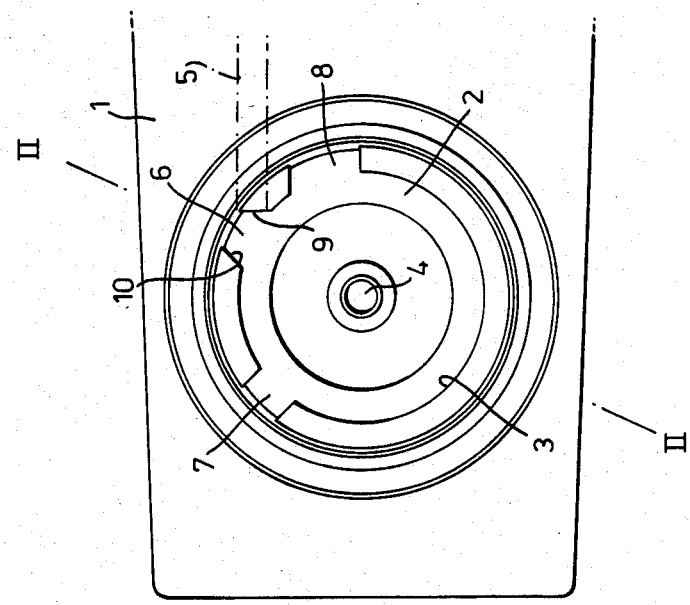

TURBINE FLOWMETER FOR FLUIDS

BACKGROUND TO THE INVENTION

The invention relates to a turbine flowmeter for fluids of the type comprising a casing having a chamber of substantially circular section into which there open an admission orifice, substantially tangential to the said chamber, and an outlet orifice, a turbine or rotor equipped with blades pivoting in the said chamber about the axis of the said chamber under the action of the fluid passing through the chamber from the admission orifice to the outlet orifice, means for measuring the speed of rotation of the rotor, the wall of the said chamber adjacent to the extremities of the turbine blades being provided with recesses substantially parallel to the axis of the chamber and creating a turbulence in the flow of fluid through the chamber.

STATEMENT OF PRIOR ART

Such a flowmeter is known from U.S. Pat. No. 3,329,021.

However the turbulence effect created upon the fluid flow by the said recesses proves insufficient to obtain the necessary precision under certain operational conditions.

OBJECT OF THE INVENTION

An object of the present invention is to palliate this drawback by creating a turbulence in the fluid flow immediately upon its admission into the chamber.

According to the invention there is provided a turbine flowmeter for fluids comprising a casing having a chamber of substantially circular section into which there open an admission orifice substantially tangential to the said chamber and an outlet orifice, a turbine equipped with blades rotatable in said chamber about the axis of said chamber under the action of the fluid passing through the chamber from the admission orifice to the outlet orifice, means for measurement of the speed of rotation of the rotor, the wall of the said chamber adjacent to the extremities of the turbine blades being equipped with recesses substantially parallel to the axis of the chamber and creating a turbulence in the fluid flow through the chamber, said admission orifice opening into one of the lateral walls of one of the said recesses of the chamber in such manner that at least a part of the fluid flow comes to strike upon the opposite lateral wall of the said recess.

The invention will now be described by way of example with reference to the accompanying drawing, wherein:

FIG. 1 is a plan view of the chamber of a flowmeter according to one example of embodiment of the invention, and FIG. 2 is a view in section along the line II—II in FIG. 1.

The flowmeter comprises a casing 1 equipped with a chamber 2 having a lateral wall 3 with substantially circular section in which there pivots, about a bearing 4, a turbine or rotor T the extremities of the blades of which move in the vicinity of the wall 3 of the chamber 2.

A fluid admission orifice 5 opens into the chamber 2 substantially tangentially to the wall 3 and an outlet orifice (not shown) permits the exit of the fluid after it has followed a substantially circular path in the chamber 2. In order to create a turbulence in the fluid flow the wall 2 is equipped with axial recesses 6, 7 and 8.

The admission orifice 5, which can be a Venturi tube, opens into a wall 9 of one of the recesses 6, in such manner that the fluid jet comes to strike the opposite wall 10 of the recess 6. Thus a significant turbulence is created in the fluid flow immediately upon its entry into the chamber 2.

The flowmeter comprises means 11 for the measurement of the speed of rotation of the rotor, which is tied to the flow rate.

I claim:
1. A turbine flowmeter for fluids comprising
   (a) a casing having a chamber of substantially circular section into which there open an admission orifice substantially tangential to the said chamber and an outlet orifice,
   (b) a turbine equipped with blades rotatable in said chamber about the axis of said chamber under the action of the fluid passing through the chamber from the admission orifice to the outlet orifice,
   (c) means for measurement of the speed of rotation of the rotor, the wall of the said chamber adjacent to the extremities of the turbine blades being equipped with recesses substantially parallel to the axis of the chamber and creating a turbulence in the fluid flow through the chamber, each recess having opposite lateral walls said admission orifice opening into one of the lateral walls of one of the said recesses of the chamber in such manner that at least a part of the fluid flow comes to strike upon the opposite lateral wall of the one of the said recesses.

* * * * *